(12) United States Patent
Moore et al.

(10) Patent No.: US 9,098,812 B2
(45) Date of Patent: Aug. 4, 2015

(54) FASTER MINIMUM ERROR RATE TRAINING FOR WEIGHTED LINEAR MODELS

(75) Inventors: Robert Carter Moore, Mercer Island, WA (US); Christopher Brian Quirk, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1128 days.

(21) Appl. No.: 12/423,187

(22) Filed: Apr. 14, 2009

(65) Prior Publication Data

US 2010/0262575 A1 Oct. 14, 2010

(51) Int. Cl.
| | |
|---|---|
| G06F 9/44 | (2006.01) |
| G06N 7/02 | (2006.01) |
| G06N 7/06 | (2006.01) |
| G06N 99/00 | (2010.01) |
| G06N 5/04 | (2006.01) |
| G06N 5/00 | (2006.01) |

(52) U.S. Cl.
CPC .............. *G06N 99/005* (2013.01); *G06N 5/003* (2013.01); *G06N 5/04* (2013.01)

(58) Field of Classification Search
USPC .......................................................... 706/52
See application file for complete search history.

(56) References Cited

U.S. PATENT DOCUMENTS

| | | | |
|---|---|---|---|
| 2004/0260543 A1* | 12/2004 | Horowitz et al. ............. | 704/221 |
| 2007/0083357 A1* | 4/2007 | Moore et al. ................. | 704/4 |
| 2007/0150257 A1* | 6/2007 | Cancedda et al. ............ | 704/2 |
| 2009/0164262 A1* | 6/2009 | Ettl et al. ..................... | 705/7 |
| 2010/0023315 A1* | 1/2010 | Quirk ............................ | 704/3 |
| 2010/0262575 A1 | 10/2010 | Moore et al. | |

OTHER PUBLICATIONS

Och, Franz Josef. Minimum Error rate training in statistical machine translation ACL '03 Proceedings of the 41$^{st}$ Annual meeting on Association for COmputational Linguistics—vol. 1. 2003. [Online] Downloaded Mar. 19, 2012 http://delivery.acm.org/10.1145/1080000/1075117/p160-och.pdf?ip=151.207.246.4&acc=OPEN&CFID=70521915&CFTOKEN=91209202&_acm_=1.*

(Continued)

*Primary Examiner* — Ben Rifkin
(74) *Attorney, Agent, or Firm* — Sandy Swain; Judy Yee; Micky Minhas

(57) ABSTRACT

The claimed subject matter provides systems and/or methods for training feature weights in a statistical machine translation model. The system can include components that obtain lists of translation hypotheses and associated feature values, set a current point in the multidimensional feature weight space to an initial value, chooses a line in the feature weight space that passes through the current point, and resets the current point to optimize the feature weights with respect to the line. The system can further include components that set the current point to be a best point attained, reduce the list of translation hypotheses based on a determination that a particular hypothesis has never been touched in optimizing the feature weights from at least one of an initial staring point or a randomly selected restarting point, and output the point ascertained to be the best point in the feature weight space.

20 Claims, 11 Drawing Sheets

(56) References Cited

OTHER PUBLICATIONS

Eisner, Jason and Roy W. Tromble. "Local Search with Very Large-Scale Neighborhoods for Optimal Permutations in Machine Translation" 2006 [Online] downloaded Sep. 3, 2013 http://www.cs.jhu.edu/~jason/papers/eisner+tromble.hard06.pdf.*

Moore et al., "Random Restarts in Minimum Error Rate Training for Statistical Machine Translation," Precedings of the 22nd International Conference on Computational Linguistics (Coling 2008), Manchester, Aug. 2008, pp. 585-292.

* cited by examiner

FASTER MINIMUM ERROR RATE TRAINING FOR WEIGHTED LINEAR MODELS

BACKGROUND

Weighed linear models are typically a very general class of statistical decision models utilized for many applications, including statistical machine translation. A weighted linear model generally computes a score as a weighted sum of features of an input and a possible output, and selects the highest (or lowest) scoring possible output considered for a given input. In statistical machine translation the input typically is a sentence in a first language to be translated (e.g., Inuktitut), and the possible outputs are candidate translations of the input sentence in a second language (e.g., Guarani). The features for example, can be logarithms of estimated probabilities of particular segments of the input language translating as particular segments of the output language, logarithms of language model probabilities of the output language, or penalties for re-ordering segments of the output language with respect to the order of the corresponding segments of the input language.

Minimum error rate training generally refers to any technique for choosing weights for values of the features of the model so as to minimize an error metric on the outputs selected for training a training set of inputs for which correct outputs are known, or equivalently maximizing a quality metric for such a set. This process of choosing weights that minimize error on the training set can be very time consuming, taking hours or days, depending on the complexity of the model.

The subject matter as claimed is directed toward resolving or at the very least mitigating, one or all the problems elucidated above, and in particular, the claimed matter is directed towards speeding up the process of selecting weights that minimize error on the training sets.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter provides systems and/or methods that iteratively generate sets of possible outputs given a set of weights, re-optimizing the weights given the set of all possible outputs generated up until a point in time, until no new possible outputs are generated. In order to facilitate such optimization, the claimed matter prunes the set of possible outputs passed on to the next iteration so that fewer outputs are considered in re-optimizing the weights, which can greatly accelerate the optimization process.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
FIG. 1 illustrates a machine-implemented system for training feature weights in a statistical machine translation model in accordance with aspects of the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

FIG. 1 illustrates a machine-implemented system 100 that minimizes error rate by training the feature weights used in a statistical machine translation model in accordance with the claimed subject matter. System 100 can include training system 102 that minimizes error rate in order to optimize feature weights in statistical machine translation (SMT) models. Training system 102 can be implemented in hardware and/or a combination of hardware and/or software. Further, training system 102 can be incorporated within and/or associated with other compatible components. Training system 102 can be any type of device, facility, and/or instrument of conversion that includes a processor. Illustrative machines, mechanisms, devices, facilities, and/or instruments of conversion that can comprise Training system 102 can include Tablet PCs, server class computing machines, laptop computers, notebook computers, desktop computers, cell phones, smart phones, consumer appliances and/or instrumentation, industrial devices and/or components, hand-held devices, personal digital assistants, multimedia Internet enabled phones, multimedia devices, and the like.

As depicted, training system 102 can receive input in the form of a training set consisting of pairs of source language sentences and their reference target language translations. In order to effectuate the foregoing, training system 102 can iteratively optimize one feature weight at a time by coordinate ascent, using a line search that takes advantage of special properties of the mapping from sets of feature weights to the resulting translation quality measurement. The line search utilized by the claimed subject matter is notable in the fact that the technique is guaranteed to find the global optimum, whereas more typical or general line search methods utilized to date only find local optima.

Global optimization of one feature weight at a time, as will be appreciated, does not ensure global optimization of all feature weights simultaneously. Thus, training system 102 can supplement the training procedure to minimize error rates by utilizing multiple random starting points for each optimization search whereby the multiple random starting points are selected from a uniform distribution. Using multiple random starting points can yield substantial improvements in the resulting model in terms of translation quality as measured by the bilingual evaluation understudy (BLEU) metric. Moreover, it has been observed that by selecting starting points by a random walk from the last point reached by coordinate ascent, rather than sampling from a uniform distribution can yield additional improvement in the bilingual evaluation understudy (BLEU) metric.

Figure 2:
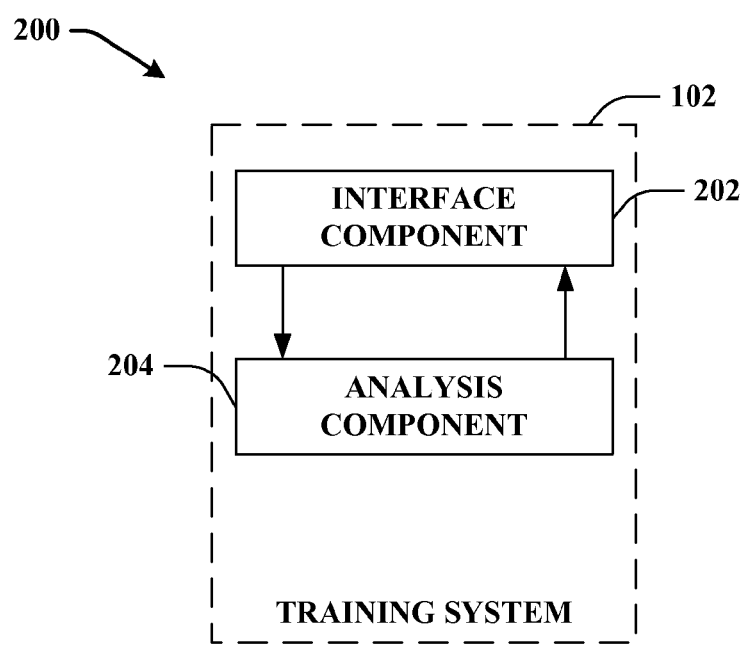
FIG. 2 provides further depiction of a machine-implemented system for training feature weights in a statistical machine translation model in accordance with aspects of the claimed subject matter.

FIG. 2 illustrates further aspects 200 of a training system 102 that in accordance with the claimed subject matter minimizes error rate by training the feature weights utilized in a statistical machine translation model. As depicted training system 102 can include interface component 202 (hereinafter referred to as "interface 202") that can received and/or disseminate, communicate, and/or partake in data interchange with a plurality of disparate sources and/or components. For example, interface 202 can receive and/or transmit data from, or to, a multitude of sources, such as, data associated with analysis component 204, as well as receive information in the form of training sets consisting of pairs of source language sentences and their reference target language translations and distribute output as a set of values for the feature weights of a statistical machine translation model. Further, interface 202 can obtain and/or receive data associated with usernames and/or passwords, sets of encryption and/or decryption keys, client applications, services, users, clients, devices, and/or entities involved with a particular transaction, portions of transactions, and thereafter convey the received or otherwise acquired information to analysis component 204, for further utilization, processing, and/or analysis.

The approach utilized by analysis component 204 to minimize error rate associated with training a statistical model can rely on two concepts. First expensive statistical machine translation decoding time can be saved by generating lists of the n-best translation hypotheses, for some value of n (e.g., n=100), together with their associated feature values, according to a statistical translation model, and then optimizing (with respect to the n-best translation hypotheses) the weights which the feature values are multiplied by in a weighted linear statistical translation model. In this manner many different feature weights can be assessed without repeatedly re-running the statistical machine translation decoder. The translation quality measurement for the training corpus can be estimated for a given point in the multidimensional feature weight space by locating the highest (or lowest) scoring translation hypothesis, out of the current set of hypotheses for each sentence in the training set.

Nevertheless, since the resulting feature weights are generally optimized for only one particular set of translation hypotheses, analysis component 204 can produce different hypotheses when run with the resulting feature weights. Accordingly, when the decoder is run with the optimized feature weights, new sets of n-best translation hypotheses can be developed for each sentence in the training set, these newly created sets of n-best translation hypotheses can then be merged with previous sets of hypotheses which in turn can be subjected to re-optimization of the feature weights relative to the expanded hypotheses sets. In accordance with an aspect of the claimed subject matter this process of running the decoder with optimized feature weights to generate further sets of n-best translation hypotheses developed for each sentence in the training set, merging the resultant further sets of n-best translation hypotheses with previously sets of hypotheses, and re-optimizing the feature weights relative to the expanded hypotheses set, can be repeated by analysis component 204 until no more hypotheses are obtained from any sentence in the training set.

Additionally, analysis component 204 can employ a method of numerical optimization that takes advantage of the fact that while translation quality metrics can have continuous values, they generally are applied to discrete outputs (e.g., any measure of translation quality can change with variations in feature weights at discrete points where the translation output changes). Analysis component 204 can thus exploit this fact by identifying all the values of a single feature weight at which the highest scoring translation hypothesis changes, out of the current set for a particular sentence, keeping the other feature weights constant. By merging the list of such points for all the sentences in the training set, a list can be obtained of all the points at which the highest scoring hypothesis changes for any training sentence.

Moreover analysis component 204, relative to the fixed set of hypotheses, can find the optimal value of the feature weights on the training set for the feature weights by evaluating the translation quality metric for each range of values for the feature weights between two such consecutive points. Additionally and/or alternatively, analysis component 204 can find the optimal value of the feature weights in the training set by tracking incremental changes in sufficient statistics for the translation quality metric as it iterates through the point where things change. This procedure can be used by analysis component 204 as a line search method in a coordinate ascent iteration through the feature weights until no additional improvement in the translation quality metric is detectable given the current sets of translation hypotheses.

While a line search as utilized by analysis component 204 in connection with each feature weight in turn can be globally optimal, this generally is insufficient to guarantee that the sets of feature weights found by such a coordinate ascent approach will provide the globally optimum combination of weights for all features. To overcome this possibility (e.g., gravitating to an inferior local optimum) it is common to perform the optimization search of each expanded set of translation hypotheses multiple times from different starting points. Typically, one of these points can be the best point found while optimizing over a previous set of translation hypotheses. Since additional hypotheses can have been added to the set of hypotheses from which the point was obtained, initiating coordinate ascent from this point on the new set of hypotheses can lead to a higher local optimum. To facilitate this aspect, analysis component 204 can select a fixed number of additional starting points by setting the initial value of each feature and sampling from a uniform distribution over a fixed interval. These randomly selected starting points can be referred to as "random restarts" which analysis component 204 can employ to locate the optimum for the current set of translation hypotheses by selecting the highest point reached by coordinate ascent from either of the previous optimum or from one of the randomly selected starting points.

While the random values employed for each feature weight can be independently sampled from a uniform distribution over a specific range (e.g., −1 to +1) it has been observed that if the selected starting point yields a training BLEU score much below the best BLEU score seen in any previous optimization search over the same set of translation hypotheses, the coordinate ascent search from that point onwards is unlikely to lead to a point that is better than the best seen up until that juncture. To mitigate this effect, analysis component 204 can bias selection of restarting points towards better scores by selecting starting points by a random walk process starting from the ending point of the last coordinate ascent search. Such biasing can be accomplished by analysis component 204 selecting restarting points through a series of random walks in feature weight space guided by the training set BLEU score. For example, analysis component 204 can locate the ending point of the last coordinate ascent search and thereafter for each subsequent progression can update preferences in a manner inspired by Metropolis-Hastings sampling. Thus, analysis component 204 starting from the current feature weight vector can sample a small update from a multivariate Gaussian distribution with mean of 0 and a diagonal covariance matrix $\sigma^2 I$ and thereafter add the update to the current value to produce a new potential feature weight vector. The BLEU scores for the old and new feature weights can then be compared and the new feature weight vector accepted if the BLEU score on the training set is improved; however, if the BLEU score drops, the new feature weight vector can still be accepted but with an associated probability based at least in part in how close the new BLEU score is relative to the previous BLEU score. After a fixed number of progressions the walk can be terminated and a value generated that can be utilized as the initial point for the next round of coordinate ascent.

Despite the foregoing approach, it has been observed that while minimizing error rates in the training of statistical machine translation models utilizing random walk restarts appears to produce better models than either minimizing error rates in the training of statistical machine translation models with uniform random restarts or with no restarts, it nevertheless can be slower than minimizing error rates in the training of statistical machine translation models with no restarts. While the differences in the time taken to minimize error rates in the training of statistical machine translation models with random walk restarts and with no restarts might appear slight given how long the overall process of creating a statistical translation model takes, to truly optimize a statistical machine translation system can require performing feature weight training repeatedly to identify optimum values of hyper-parameters such as maximum phrase size and/or distortion limit. This kind of optimization is rarely performed for every small model change, given how long feature weight optimization can take. Accordingly, it seems well worth the effort to accelerate the optimization as much as possible. To this end, the claimed matter, and in particular, training system 102 can include a pruning aspect that reduces the size of the set of hypotheses over which feature weight optimization is performed, which in turn reduces the time required to perform the optimization.

Figure 3:
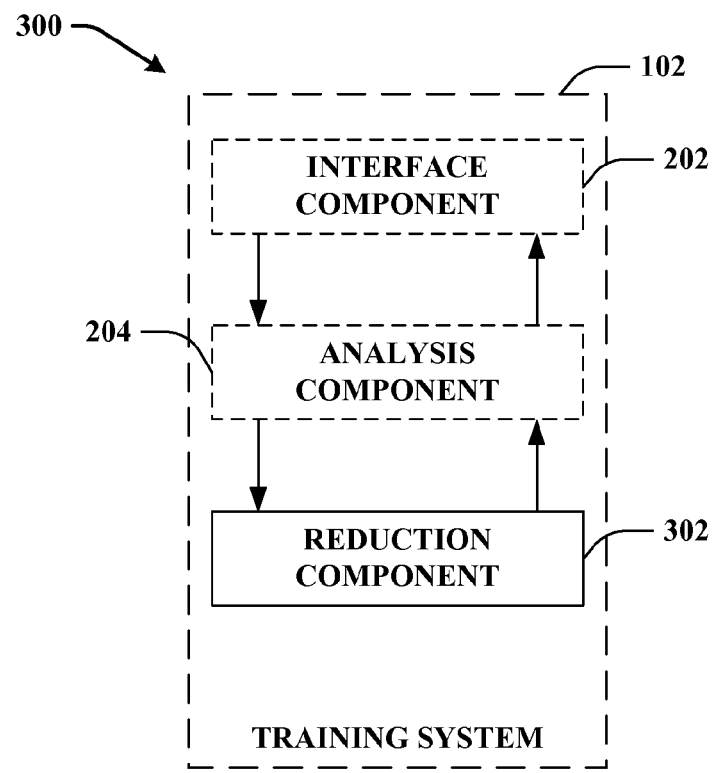
FIG. 3 provides yet another depiction of an illustrative a machine-implemented system for training feature weights in a statistical machine translation model in accordance with aspects of the claimed subject matter.

FIG. 3 provides further illustration of training system 102 in accordance with further aspects of the claimed subject matter. As illustrated training system 102, in addition to interface 202 and analysis component 204 expounded upon in connection with FIG. 2 above, can include reduction component 302 that can prune the set of hypotheses to which the regimen to minimize error rates associated with training feature weights utilized in a statistical machine translation model is applied.

Observation indicates that the time taken by the random walk and coordinate ascent phases as performed by analysis component 204 can be roughly linear in the number of translation hypotheses examined. For example, during testing of the claimed subject matter it was found that after the first iteration utilizing n-best lists of 100 for each of 2000 training sentence pairs, there were 196,319 hypotheses in the n-best lists and that the system took 347 seconds to accomplish the task of optimizing the feature weights to minimize translation error. By the sixth iteration, after merging all hypotheses, there were 800,580 hypotheses, and the system took 1380 seconds to complete the optimization search.

On the basis that a large proportion of these hypotheses are low scoring according to most possible combinations of values for the translation model feature weights, omitting them can make little difference to the overall feature weight optimization process. Accordingly, based on the foregoing observations, reduction component 302 can identify hypotheses that are both low scoring according to most combinations of values for the translation model feature weights by extracting additional information from the line search procedure effectuated by analysis component 204.

Analysis component 204, as it effectuates the line search, can note every hypothesis that is the highest scoring hypothesis for a particular sentence for some value of the feature weight being optimized by the line search. Reduction component 302, in conjunction with the observation that hypotheses that are never the highest scoring hypothesis for any combination of feature values explored generally play no role in the training, can therefore prune those hypotheses that are never selected as potentially highest scoring in a particular round of optimization search from the hypothesis set without adversely affecting the quality of the feature weights that are eventually produced.

In effectuating the foregoing, reduction component 302 can adopt one or both of the following pruning strategies. In the more conservative implementation, called "post-restart pruning", reduction component 302, after each decoding iteration, can identify all the hypotheses that were "touched" (e.g., became the highest scoring hypothesis, for some combination of feature weight values considered) during the coordinate ascent search either from the initial starting point or from one of the random starts as facilitated by analysis component 204. Any hypothesis that was never touched can then be pruned by reduction component 302 from the set of hypotheses that are to be merged with the results of subsequent n-best decoding iterations. Additionally and/or alternatively, in a more aggressive implementation, called "pre-restart pruning", after each decoding iteration reduction component 302 can identify all the hypotheses that were touched during the coordinate ascent search from the initial starting point as performed by analysis component 204.

Hypotheses that were never touched can be pruned from the hypothesis set before any random restarts are performed by analysis component 204.

Figure 4:
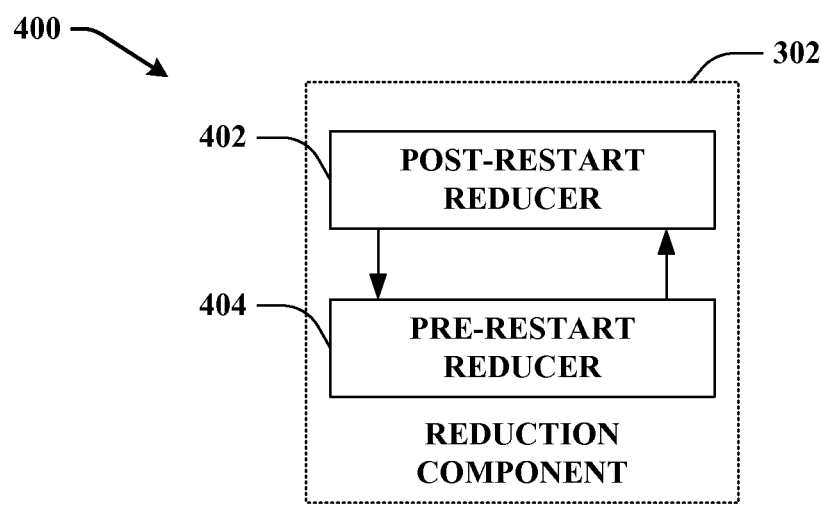
FIG. 4 provides a more detailed depiction of a reduction component that can prune hypotheses that are never selected as potentially highest scoring in a particular round of minimum error rate training (MERT).

FIG. 4 provides further depiction of reduction component 302 that prunes hypotheses in accordance with an aspect of the claimed subject matter. As illustrated, reduction component 302 can include a post-restart reducer 402, that based at least in part on input received from, and subsequent to each decoding iteration performed by, analysis component 402, identifies all the hypotheses that were ever touched during the coordinate ascent search either from the initial starting point or from one of the random restarts. Post-restart reducer 402 based on the identification of hypotheses that were touched during the coordinate ascent search either from the initial starting point or from one of the random restarts, prunes those hypothesis that were never touched from the sets of hypotheses that are merged with the results of subsequent n-best decoding iterations. In this manner the sets of hypotheses can be appreciably reduced leading to marked reductions in overall training times.

Further, reduction component 302 can also include pre-restart reducer 404 that can more aggressively reduce the sets of hypotheses. Pre-restart reducer 404, based at least in part on the input received from, and subsequent to each decoding iteration performed by, analysis component 402, notes all the hypotheses that were touched during the coordinate ascent search from the initial starting point. Based on this information, pre-restart reducer 404 can thereafter prune hypotheses that were not touched from the hypothesis set before any random restarts are initiated by analysis component 204. In this manner the hypotheses sets can be reduced significantly as can the times necessary to train the statistical machine translation system.

In view of the illustrative systems shown and described supra, methodologies that may be implemented in accordance with the disclosed subject matter will be better appreciated with reference to the flow charts of FIGS. 5-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

Figure 5:
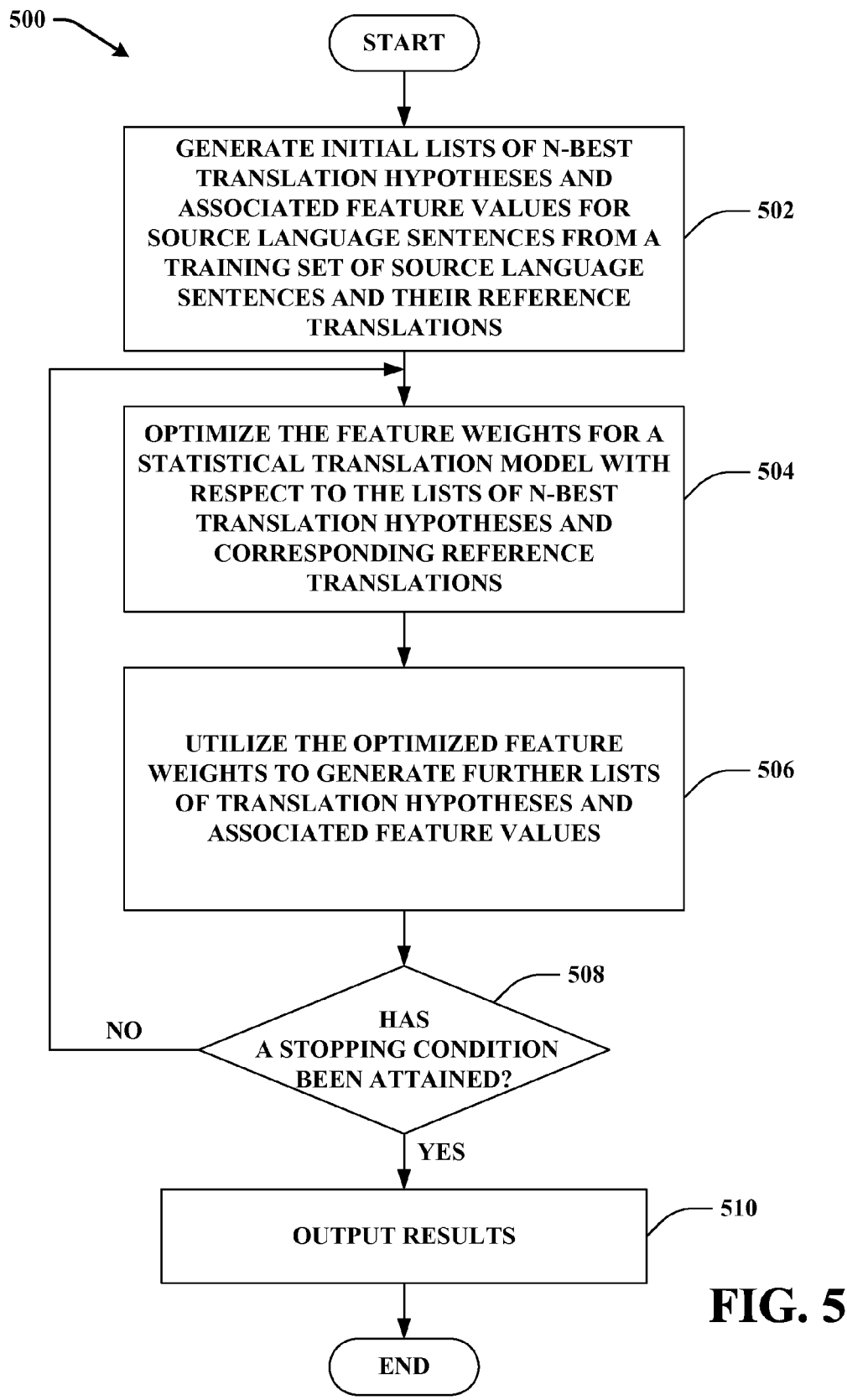
FIG. 5 illustrates a flow diagram of a machine implemented methodology that effectuates and facilitates minimization of error rate in the training of a statistical machine translation model in accordance with aspects of the claimed subject matter.

FIG. 5 provides a generalized method 500 that minimizes the error rate associated with training statistical machine translation models in accordance with the claimed subject matter. Method 500 can commence at 502 where a statistical machine translation training system can be employed to generate initial lists of n-best translation hypotheses and associated feature values for the source language sentences from a training set of source language sentences and their reference translations. At 504 the feature weights for a statistical translation model can be optimized with respect to the lists of n-best translation hypotheses and corresponding reference translations. At 506 the optimized feature weights can be utilized to generate further lists of translation hypotheses and their associated feature values. At 508 an assessment is made as to whether a stopping condition has been attained or satisfied. In accordance with an aspect of the claimed subject matter this stopping condition can be whether or not any more new hypotheses are obtained for any sentence in the training set. Additionally and/or alternatively, the stopping condition can be whether or not a fixed number of iterations have been performed. If the response to the stopping condition query is negative (e.g., NO) method 500 can cycle back to 504, otherwise where the response to the stopping condition is affirmative (e.g., YES) method 500 can proceed to 510 where the results of the method can be output for further analysis or use.

Figure 6:
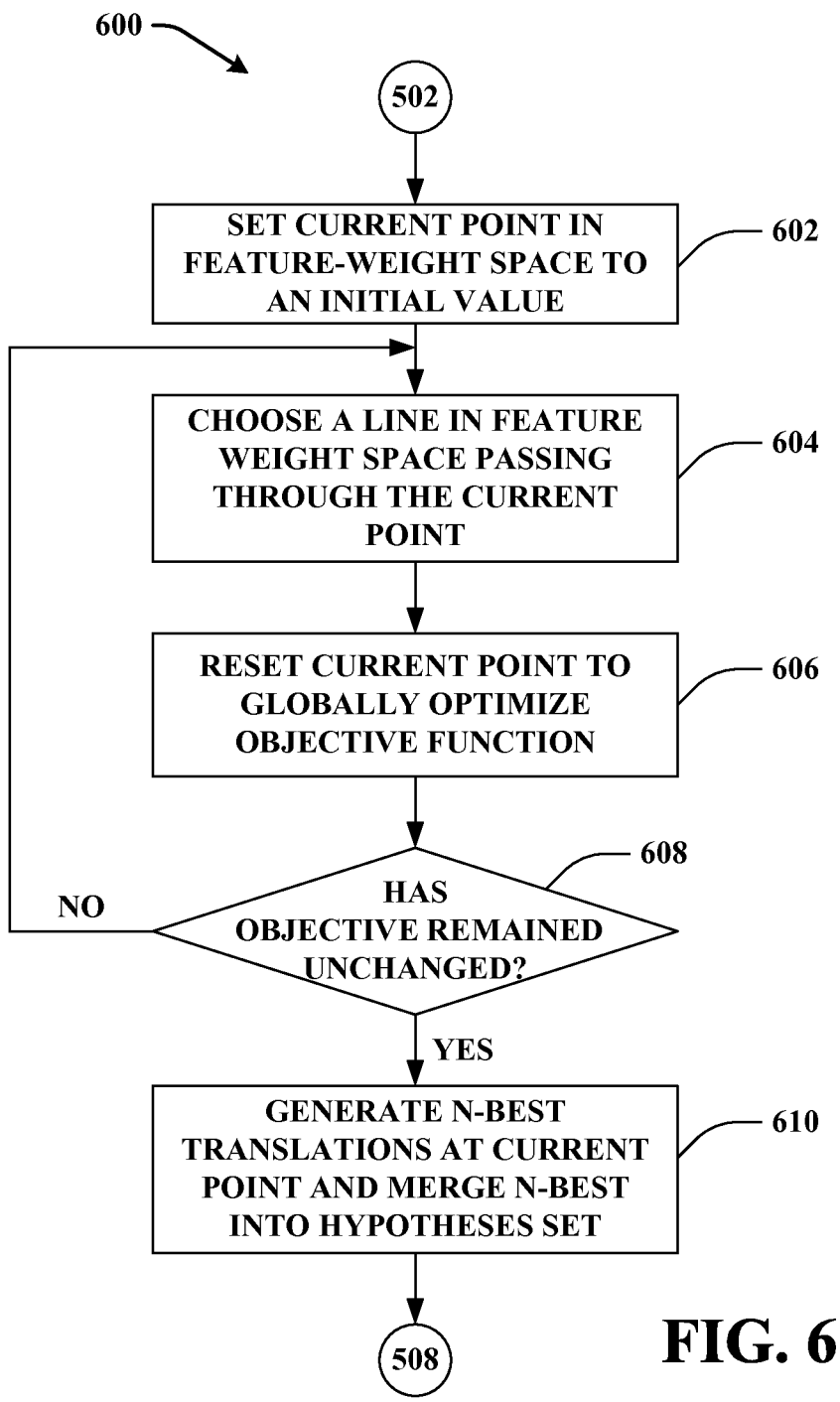
FIG. 6 depicts a machine implemented method that minimizes the error rates associated with training a statistical machine translation model in accordance with aspects of the claimed subject matter.

FIG. 6 provides depiction of a further methodology 600 that minimizes the error rate associated with training statistical machine translation models in accordance with aspects of the claimed subject matter. As illustrated methodology 600 can replace, or be in addition to, acts 504-506 as set forth and described in connection with method 500 above. Thus, once the statistical machine translation training system has generated lists of translation hypotheses and associated feature values at 502, methodology 600, at 602, can set the current point in the feature weight space to an initial value and proceed to 604. At 604 a line in the feature weight space can be selected that passes through the selected current point. At 606 the current point is reset to globally optimize an objective function along the chosen line. At 608 a determination is made as to whether or not the objective function for the hypotheses set at issue has remained unchanged for a complete cycle through a set of lines spanning the multidimensional feature weight space. If the determination at 608 yields a negative result (e.g., NO), methodology 600 can cycle back to 604, otherwise if the response to the determination carried out at 608 is positive (e.g., YES), methodology 600 can proceed to 610 where the n-best translations for the development set at the current point can be generated and these n-best translations can be merged into the hypotheses set after which the methodology can progress to 508 (e.g., in method 500).

Figure 7:
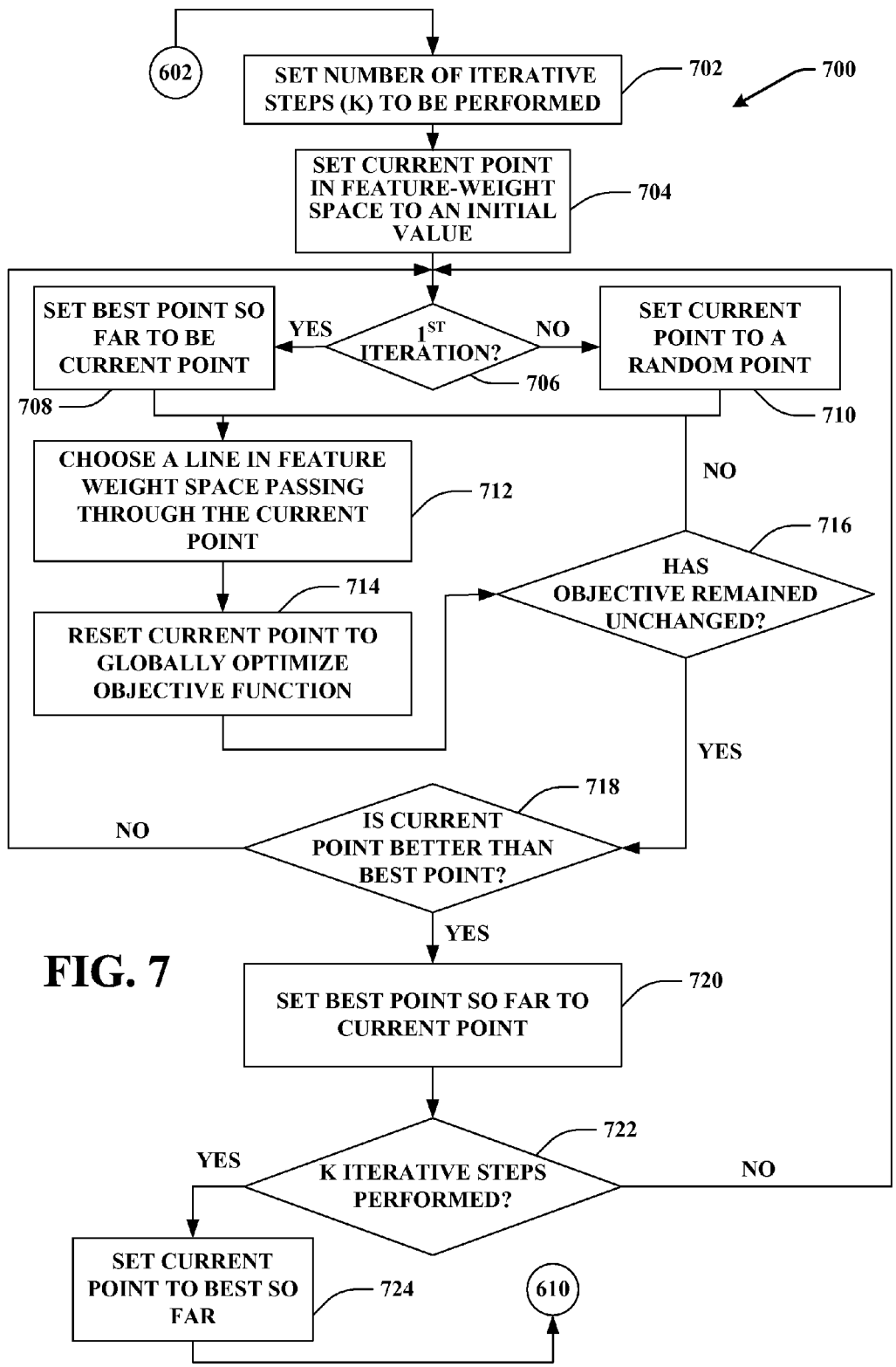
FIG. 7 illustrates a further method that can be utilized to minimize the error rates associated with training a statistical machine translation model in accordance with aspects of the claimed subject matter.

FIG. 7 provides illustration of a methodology 700 that minimizes the error rate associated with training statistical machine translation models in accordance with aspects of the claimed subject matter. Method 700 can be additional and/or alternative acts to those outlined by acts 604-606 above. As depicted method 700, after the current point in the feature weight space has been set to an initial value at 602, can commence at 702 where a number of iterations (K) can be set at which point method 700 can proceed to 704. At 704 the current point in the feature weight space can be set to an initial value after which method 700 can proceed to 706. At 706 a determination can be made as to whether this is the first iteration being performed through a list of translation hypotheses. If it is ascertained at 706 that this is the first iteration through the list of translation hypotheses (e.g., YES) the method can proceed to 708 where the best point that has been attained so far can be set to be the current point at which time the method can proceed to 712. Alternatively, if the determination at 706 is that this is not the first iteration through the list of translation hypotheses (e.g., NO) the current point can be set to a random point at 710 after which the method can progress to 712. At 712 a line in the feature weight space passing through the current point can be selected. At 714 the current point can be reset in order to globally optimize the objective function along the line that passes through the current point. At 716 a determination can be made as to whether or not the objective function has remained unchanged for a complete cycle through a set of lines spanning the multidimensional feature weight space. If the determination at 716 yields a negative result (e.g., NO), method 700 can cycle back to 712. Where the determination at 716 yields a positive result (e.g., YES), method 700 can proceed to 718. At 718 a further decision can be made as to whether or not the current point is better than the best point identified so far. If the response to the query at 718 is negative (e.g., NO) the method can cycle back to 706. Conversely, where the response to the query at 718 is affirmative (e.g., YES) the method can progress to 720 where the best point attained so far can be set to the current point. At 722 another decision block can be encountered at which point a determination can be made as to whether the set number of iterative steps (K) have been performed. If at 722 it is determined that insufficient iterative steps have been undertaken (e.g., NO), method 700 can cycle back to 706, alternatively if sufficient iterative steps have been performed (e.g., YES) method 700 can proceed to 724 where the current point can be set to the best point seen so far, after which method 700 can return to act 610 in methodology 600.

In an additional or alternative aspect of the claimed subject matter and in relation to act 708 elucidated in connection with method 700, at act 708 instead of selecting additional staring points at random, starting points can be chosen by performing a random walk from the end of the last coordinate ascent search through the multidimensional feature weight space. The random steps necessary for the random walk can be generated by sampling a multivariate Gaussian distribution with a 0 mean and diagonal covariance matrix $\sigma^2 I$. Moreover, while the random walk is being performed all random steps that lead to improved BLEU scores can be accepted whereas all steps that result in a loss of more than 0.5 BLEU, for example, can be rejected. Additionally, during the random walk where a random step is situated between an improved BLEU score and steps that result in a loss of less than 0.5 BLEU, for instance, can either be accepted or rejected based at least in part on whether or not the random steps at issue have a smoothly varying probability. Furthermore, the variable $\sigma^2$ can be tuned over N steps (e.g., 250) to produce an acceptance rate approximately equal to 60%, for instance, after which the point with the best BLEU score over the next N steps (e.g., 250) can be returned.

Figure 8:
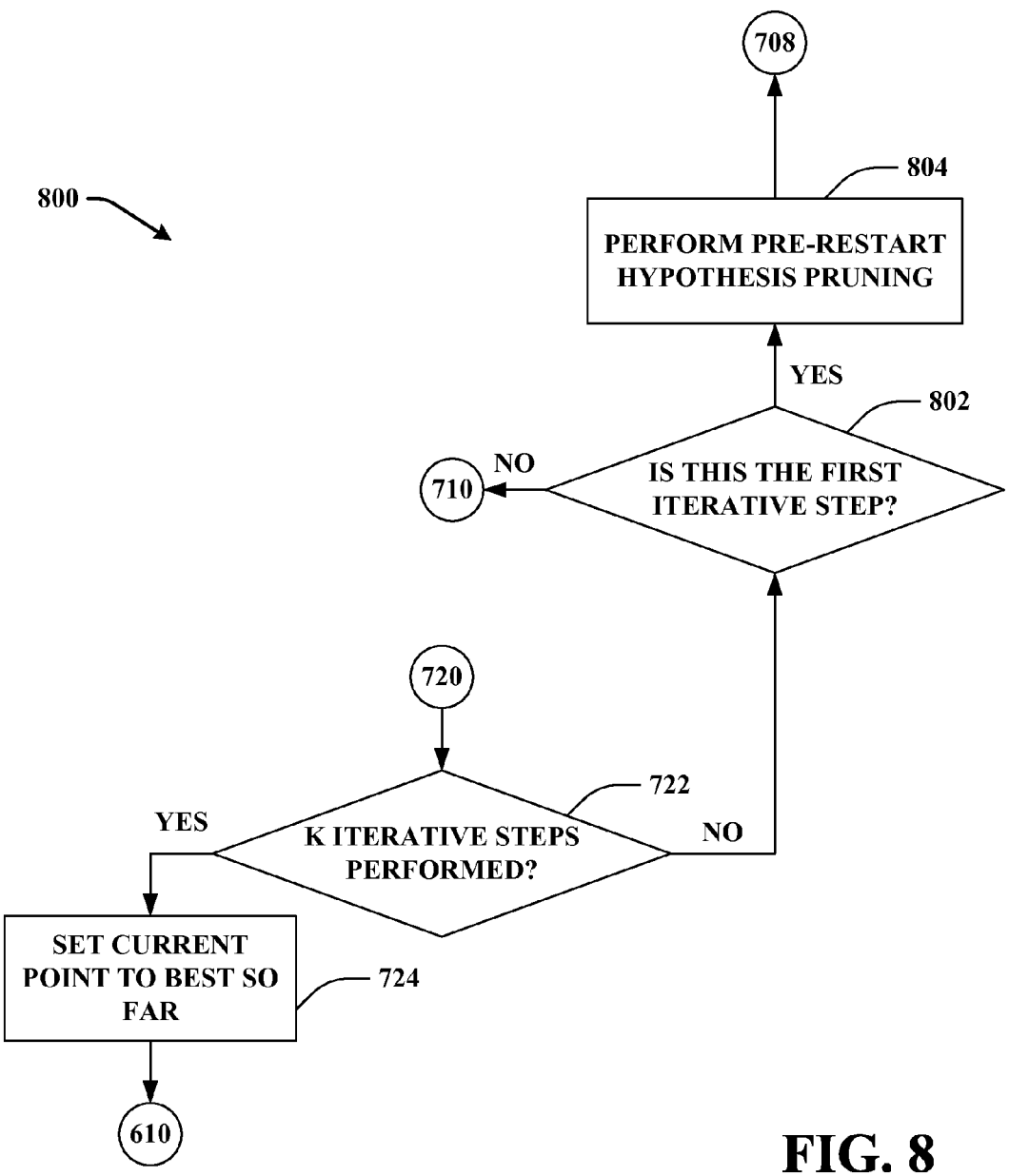
FIG. 8 provides exemplification of an additional method that can be employed to minimize the error rates associated with training statistical machine translation models in accordance with aspects of the claimed subject matter.

FIG. 8 provides illustration of a further method 800 that can be employed to minimize the error rates associated with training statistical machine translation models in accordance with additional aspects of the claimed subject matter. As depicted, method 800 can continue after act 722 where a decision has been made as to whether or not a sufficient number of iterative steps have been performed. Where it is determined at 722 that fewer iterative steps have been performed (e.g., NO) methodology 800 can proceed to 802 where a determination can be made regarding whether or not the current step is the first iterative step. If it is ascertained at 802 that the current step is not the first iterative step (e.g., NO), the method 800 can proceed to 710, otherwise where it is determined that the current step is the first iterative step (e.g., YES) method 800 can proceed to 804 where pre-restart hypothesis pruning can be actuated. In order to facilitate pre-restart pruning at 804 all hypotheses that were touched during the coordinate ascent search from the initial starting point can be identified and those hypotheses that were never touched can be pruned from the hypothesis set before any random restarts are performed. Once hypotheses that were never touched have been pruned from the hypothesis sets method 800 can progress to act 708 as described in relation to FIG. 7. Conversely, at 722 where it is determined that sufficient iterative steps have been carried out (e.g., YES) method 800 can proceed to 724 where the current point can be set to the best point seen so far, after which method 800 can return to act 610 wherein processing can continue as outlined in FIG. 6.

Figure 9:
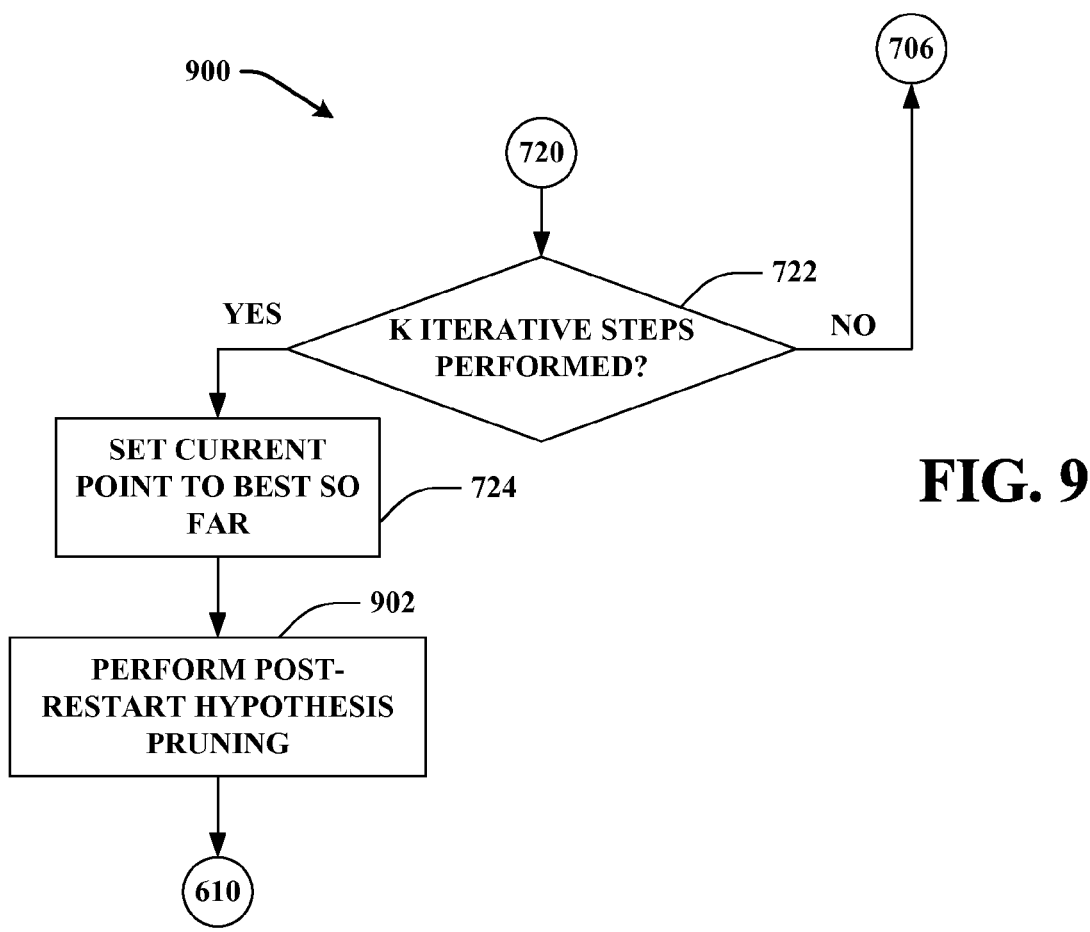
FIG. 9 provides depiction of a further method that can be employed to minimize the error rate associated with training statistical machine translation models in accordance with aspects of the claimed subject matter.

FIG. 9 provides depiction of a further methodology 900 that can be utilized as an alternative or additional series of acts to those elucidated with regard to method 800 above. Like method 800, methodology 900 can commence after act 722 has made a determination as to whether or not a sufficient number of iterative steps have been performed. If at 722 it is ascertained that sufficient iterative steps (e.g., YES) have been performed method 900 can progress to 724 where the current point can be set to the best point that has been observed so far after which method 900 can advance to 902 where post-restart hypothesis pruning can be effectuated. Post-restart hypothesis pruning can be set in motion by, after each decoding iteration, noting all the hypotheses that were ever touched during the coordinate ascent search either from the initial starting point or from one of the random restart; hypotheses that were never touched can be deleted from the sets of hypotheses that are to be merged with the results of subsequent n-best decoding iterations. Once post-restart hypothesis pruning has been carried out at 902, method 900 can proceed to act 610 as detailed with regard to FIG. 6 above. Where at 722 it is determined that insufficient iterative steps (e.g., NO) have been carried out, method 900 can advance to act 706 as described in relation to FIG. 7.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
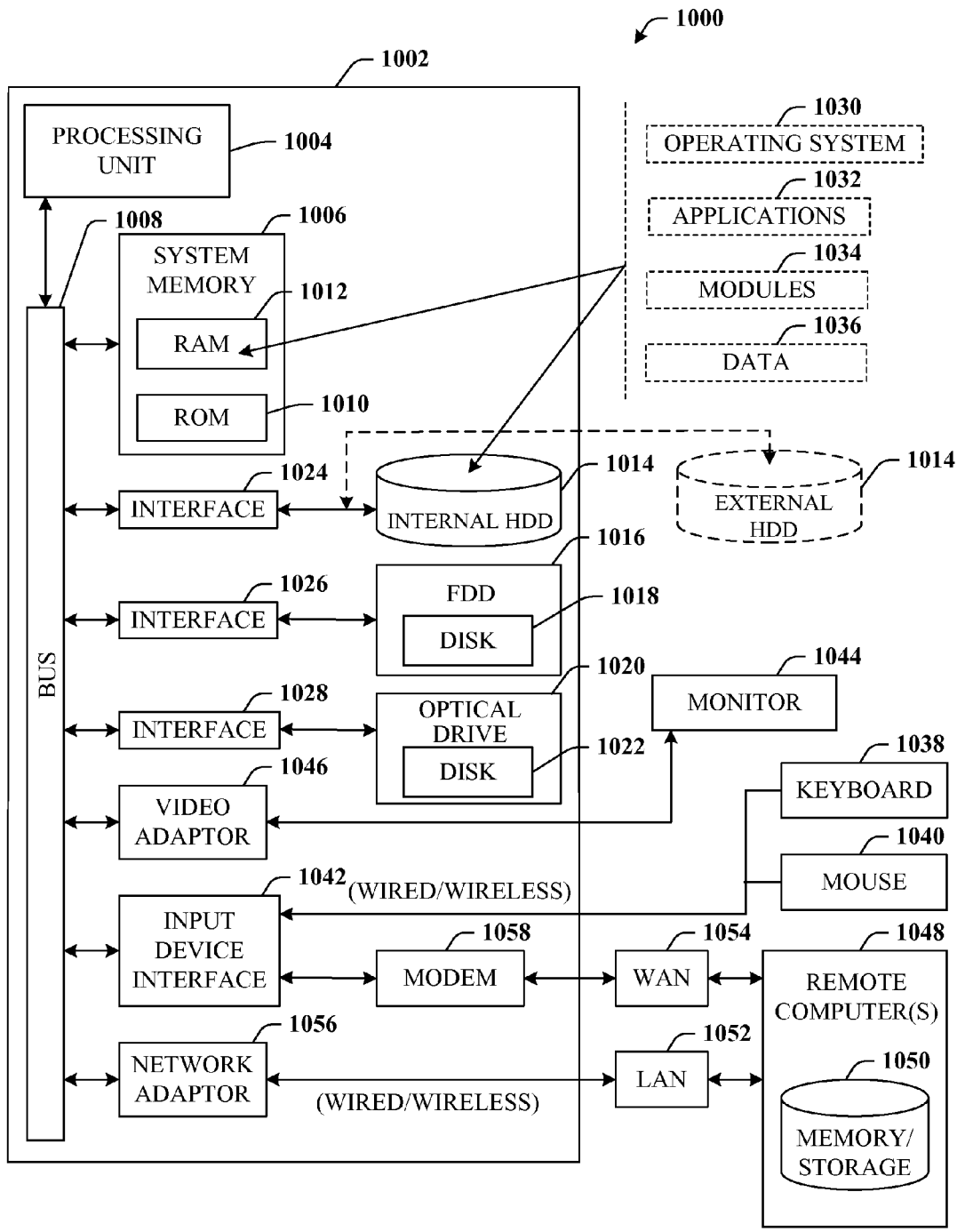
FIG. 10 illustrates a block diagram of a computer operable to execute the disclosed system in accordance with an aspect of the claimed subject matter.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the illustrative environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are illustrative and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10 BaseT wired Ethernet networks used in many offices.

Figure 11:
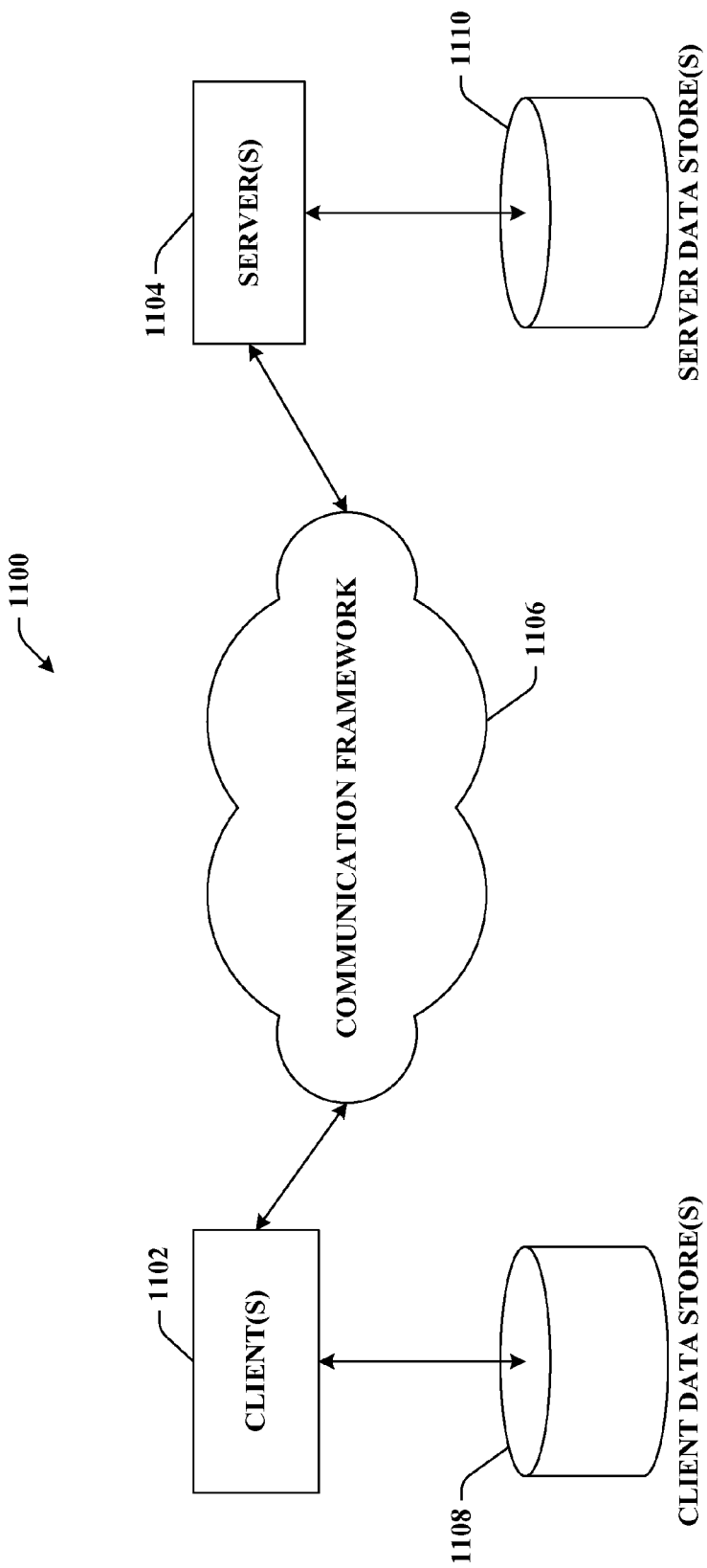
FIG. 11 illustrates a schematic block diagram of an illustrative computing environment for processing the disclosed architecture in accordance with another aspect.

Referring now to FIG. 11, there is illustrated a schematic block diagram of an illustrative computing environment 1100 for processing the disclosed architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more processors; and
   one or more computer-readable storage media to store instructions that are executable by the one or more processors to perform acts comprising:
   determining an n-best list of translation hypotheses and associated feature values, the associated feature values defining a multidimensional feature weight space;
   setting a current point in the multidimensional feature weight space to an initial value;
   selecting a line in the multidimensional feature weight space that passes through the current point;
   resetting the current point to optimize one or more feature weights with respect to the line;
   setting the current point to be a best point attained;
   performing a post-restart pruning of the n-best list of translation hypotheses based at least in part on a determination that a first set of hypotheses were not touched in optimizing the one or more feature weights;
   performing a pre-restart pruning of the n-best list of translation hypotheses based at least in part on a determination that a second set of hypotheses were not touched in optimizing the one or more feature weights; and
   outputting a point determined to be the best point attained in the multidimensional feature weight space.

2. The system of claim 1, the acts further comprising:
   generating an additional list of translation hypotheses that were touched in optimizing the one or more feature weights; and
   merging the additional list of translation hypotheses with the n-best list of translation hypotheses to create a merged list of translation hypotheses.

3. The system of claim 2, the acts further comprising:
   generating the additional list of translation hypotheses based at least in part on the one or more feature weights.

4. The system of claim 2, the acts further comprising:
   re-optimizing the one or more feature weights relative to the merged list of translation hypotheses.

5. The system of claim 1, the acts further comprising:
   setting the current point to a random point based on a multivariate probability distribution that has a mean of zero and a diagonal covariance matrix.

6. A method performed by one or more processors executing instructions to perform acts comprising:
   determining an n-best list of translation hypotheses and associated values for a set of features, a set of feature weights that correspond to the set of features defining a multidimensional feature weight space;
   setting a current point in the multidimensional feature weight space to an initial value;
   choosing a line in the feature weight space that passes through the current point;
   resetting the current point to optimize the set of feature weights with respect to the line;
   setting the current point to be a best point attained;
   performing a post-restart pruning of the n-best list of translation hypotheses based at least in part on a determination that a first set of hypotheses were not touched in optimizing the set of feature weights from at least one of an initial starting point or a randomly selected restarting point;
   performing a pre-restart pruning of the n-best list of translation hypotheses based at least in part on a determination that a second set of hypotheses were not touched in optimizing the one or more feature weights; and
   outputting a point determined to be the best point attained in the feature weight space.

7. The method of claim 6, further comprising:
   merging an additional list of translation hypotheses that were touched in optimizing the set of feature weights with the n-best list of translation hypotheses to create a merged list of translation hypotheses.

8. The method of claim 7, further comprising:
   identifying one or more hypotheses that were touched during a coordinate ascent search either from the initial starting point or the randomly selected restarting point, the one or more hypotheses touched in response to becoming a highest scoring hypothesis for a particular combination of feature weight values; and
   pruning a portion of the additional list of translation hypotheses that were not touched before merging the additional list of translation hypotheses with the n-best list of translation hypotheses.

9. The method of claim 7, further comprising:
identifying one or more hypotheses that were touched during a coordinate ascent search from the initial starting point; and
pruning a portion of the additional list of translation hypotheses that were not touched before using the randomly selected restarting point.

10. The method of claim 7, further comprising:
generating further lists of translation hypotheses based at least in part on the optimized feature weights.

11. The method of claim 7, further comprising:
re-optimizing the set of feature weights relative to the merged list of translation hypotheses.

12. The method of claim 6, further comprising:
establishing a base line value below which a bilingual evaluation understudy (BLEU) score associated with a potential feature weight vector is prevented from falling.

13. The method of claim 6, further comprising:
determining the randomly selected restarting point based on a multivariate probability distribution that has a mean of zero and a diagonal covariance matrix.

14. The method of claim 6, further comprising:
tuning a variance parameter to ensure an acceptance rate range between 40% and 70%.

15. A method performed by one or more processors configured with specific instructions, the method comprising:
determining an n-best list of translation hypotheses and associated values for a set of features;
defining a multidimensional feature weight space using a set of feature weights corresponding to the set of features;
setting a current point in the multidimensional feature weight space to an initial value;
choosing a line in the feature weight space that passes through the current point;
resetting the current point to globally optimize one or more feature weights of the set of feature weights;
setting the current point in the multidimensional feature weight space to be a best point attained;
performing a post-restart pruning of the n-best list of translation hypotheses based at least in part on a determination that a first set of hypotheses were untouched during a coordinate ascent search from at least one of an initial starting point or a randomly selected restarting point;
performing a pre-restart pruning of the n-best list of translation hypotheses based at least in part on a determination that a second set of hypotheses were untouched during the coordinate ascent search from the initial starting point; and
outputting a point ascertained to be the best point attained in the feature weight space.

16. The method of claim 15, further comprising:
merging an additional list of translation hypotheses that were touched in optimizing the one or more feature weights with a previously determined n-best list of translation hypotheses to create a merged list of translation hypotheses.

17. The method of claim 15, further comprising:
determining further lists of translation hypotheses based at least in part on the one or more optimized feature weights.

18. The method of claim 16, further comprising:
re-optimizing the one or more feature weights relative to a merged list of translation hypotheses.

19. The method of claim 15, further comprising:
establishing a base line value below which a bilingual evaluation understudy (BLEU) score associated with a potential feature weight vector is prevented from falling.

20. The method of claim 15, further comprising:
determining the randomly selected restarting point based on a multivariate probability distribution that has a mean of zero and a diagonal covariance matrix.

* * * * *